United States Patent [19]

Schotter et al.

[11] 4,383,460
[45] May 17, 1983

[54] SELF ALIGNING PILLAR POST FOR GLASS CUTTERS

[75] Inventors: Richard D. Schotter, Glenwood; Robert P. Heinis, Totowa, both of N.J.

[73] Assignee: Red Devil Inc., Union, N.J.

[21] Appl. No.: 277,873

[22] Filed: Jun. 26, 1981

[51] Int. Cl.³ .............................................. B26D 3/08
[52] U.S. Cl. ..................................... 83/886; 30/164.95
[58] Field of Search ................. 83/879, 880, 881, 882, 83/883, 884, 885, 886; 225/96, 96.5; 30/164.95, 164.9

[56] References Cited

U.S. PATENT DOCUMENTS 2,707,849  5/1955  DeVore ................................... 49/52
3,160,043 12/1964  Judd, Jr. ................................. 83/12
3,461,755  8/1969  Gerew et al. ........................... 83/12
3,850,063 11/1974  Witkowski ............................ 83/886

Primary Examiner—Robert E. Garrett
Assistant Examiner—Lawrence H. Meier

[57] ABSTRACT

A pillar post assembly for holding the cutting wheel of a glass cutting machine in which the glass cutting wheel is carried by a holder in a post swivel. The post swivel is mounted within a hollow housing for use in a glass cutting machine. The post swivel and cutting wheel holder are permitted limited vertical movement and rotation within the housing so that the cutting wheel adjusts itself to the most favorable position as it begins its first travel across the glass. Friction means within the pillar post assembly, keeps the cutting wheel in the said most favorable position for successive cuts.

11 Claims, 5 Drawing Figures

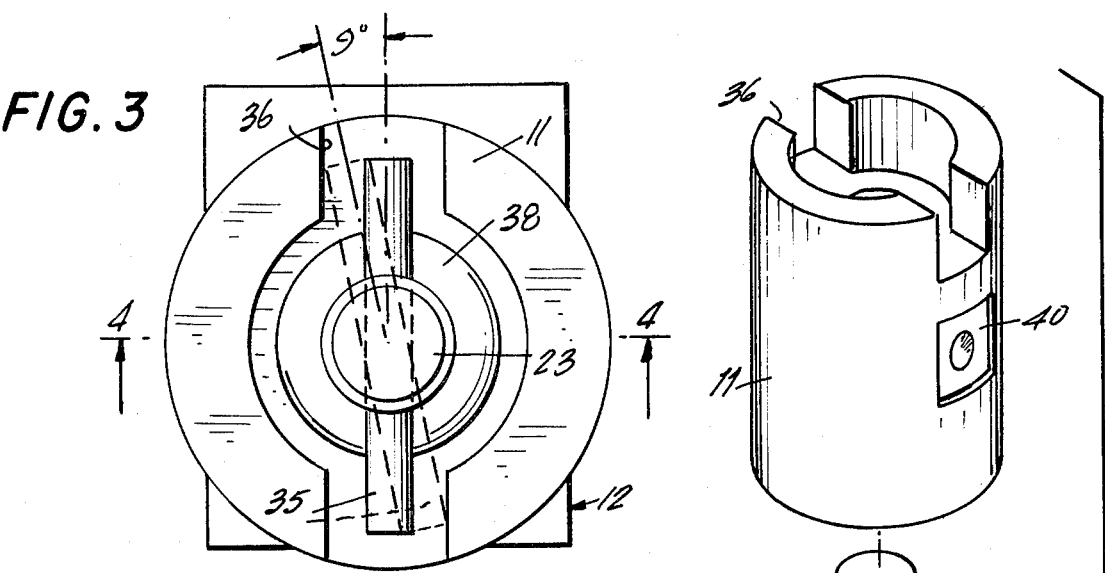
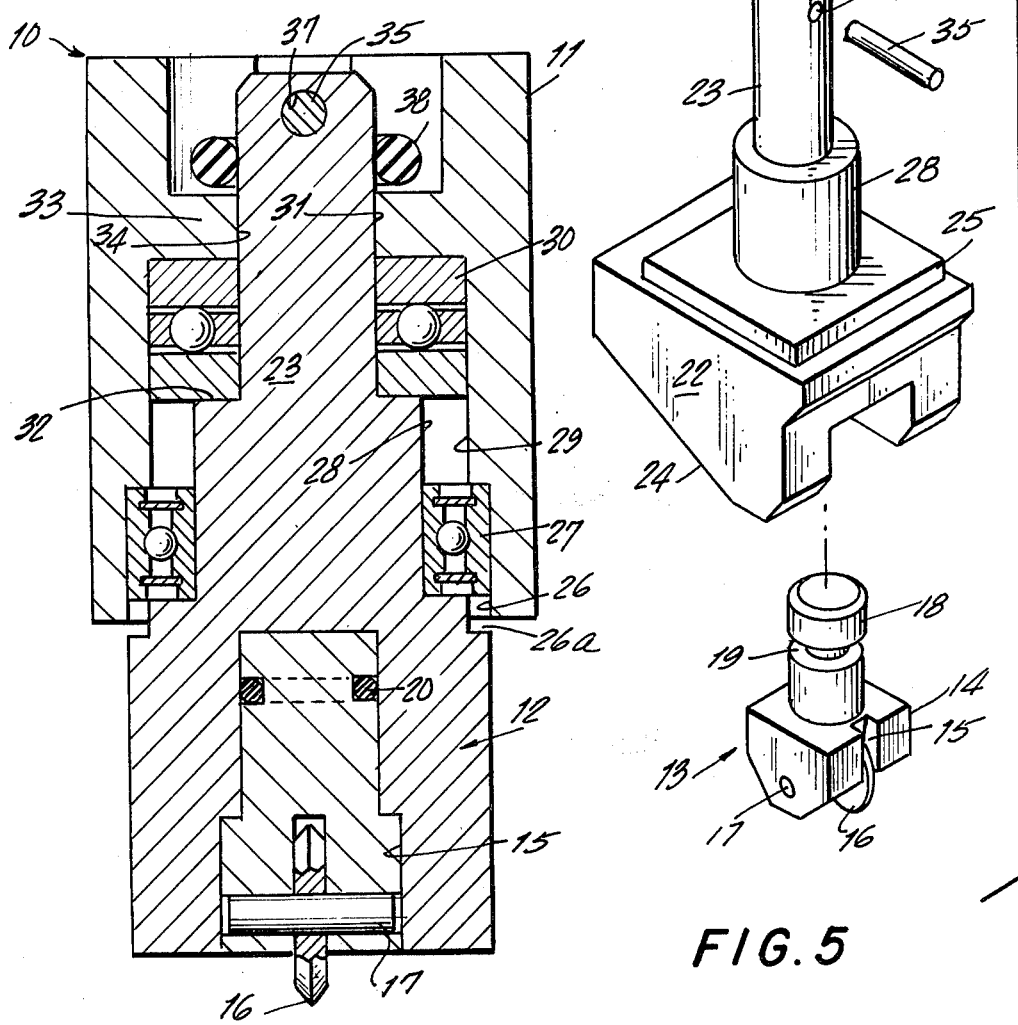
FIG. 3
FIG. 4
FIG. 5

SELF ALIGNING PILLAR POST FOR GLASS CUTTERS

BACKGROUND OF THE INVENTION

This invention relates to glass cutting devices useful in high speed glass cutting machines. In such machines, it is customary to employ a pillar post as a holder for the glass cutting wheel. Due to different cutting speeds and the respective motion of the glass with respect to the cutting wheel, the alignment of the wheel may vary from time to time. Misalignment of the wheel before or during a cut can result in rough edges and early failure of the cutting ability of the wheel.

It is known to align the wheel in a pillar post prior to the cutting operation and secure the pillar post in its aligned position following which it remains in such position during the cutting operation. It is also known to form the glass cutters with posts having shafts offset from the cutting wheel to provide a caster action which permits the wheel to swivel during its travel and presumably take the required path of travel. However, wheels of this type begin their cut at one edge of the sheet of glass and are carried off the opposite edge by the cutting machine. As they return to their original position and again meet the edge of the glass for a successive cut such devices must again align themselves with the result that rough edges or "hooks" are formed.

In U.S. Pat. No. 3,160,043 issued to Judd, Dec. 8, 1964 it was attempted to combine the prior art by means of a post which would return to its original preset position after each cut.

SUMMARY OF THE INVENTION

The self aligning pillar post made in accordance with the present invention carries a glass cutter wheel within a holder which is free to turn within a post swivel the housing is held in the glass cutting machine. An elastomer "O" ring is positioned between the post wheel holder and the post swivel to restrain the swiveling action of the holder. As a result, when the cutting wheel meets the edge of the glass to be cut for the first time it will take the most desirable position for cutting operation by reason of the swiveling and castering action. Thereafter, by reason of the elastomer ring the cutting wheel will on its next cutting traverse be in substantially the same position that it took during the preceding cut. In the event that there is a change in operation of the glass cutting machine the pillar post in accordance with the present invention will automatically cause the cutting wheel to change its adjustment to compensate for the difference in cutting conditions. Longer cutting wheel life and more uniform cuts are achieved by the present construction.

BRIEF DESCRIPTION OF THE INVENTION

In the accompanying drawings forming part hereof similar parts have been given the same reference numerals in which drawings:

FIG. 3 is a view similar to FIG. 1 but taken at right angles thereto.

FIG. 4 is a cross sectional view taken on line 4—4 in FIG. 3.

FIG. 5 is a somewhat exploded isometric view of the apparatus shown in FIGS. 1-4.

DESCRIPTION OF THE PREFERRED EMBODIMENT

Figure 1:
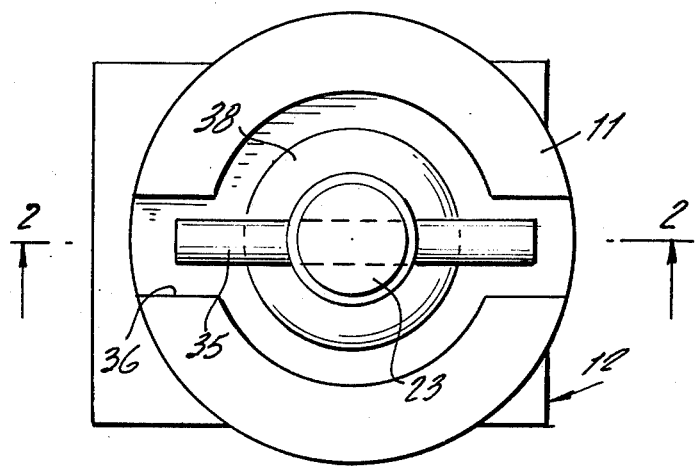
FIG. 1 is a plan view of a self aligning pilar post assembly made in accordance with the present invention.

Referring to the drawings there is shown a pillar post 10 for a glass cutter having a housing 11, a post swivel 12 carried within the housing 11 and a wheel holder 13 freely mounted within the post swivel 12.

The wheel holder consists of a block 14 provided with a slot 15 at the bottom thereof within which there is mounted a glass cutting wheel 16. The glass cutting wheel 16 is freely journaled upon a transverse axle 17. The ends of the axle 17 are co-extensive with the sides of the block 14 and when the wheel holder is inserted within the post swivel as shown in FIGS. 4 and 5, the sides of the post swivel slot 15 prevent the ends of the axle 17 from moving laterally.

A cylindrical pillar member 18 is formed on the wheel holder 13 above the block 14. The pillar member is grooved as shown at 19 near the upper end thereof to receive a elastomer snap ring 20. The outside diameter of the snap ring 20 is slightly greater than the inside diameter of the bore 21 of the post swivel 12 within which the pillar member is received. The pillar member is thereby retained with the post swivel 12 by the frictional contact of the snap ring 20 within the bore 21.

The post swivel 12 consists of a wheel holder retaining block 22 and an upstanding two diameter shank 23. The retaining block 22 is beveled as indicated at 24 to provide a clearance between the glass cutting wheel 16 and the bottom of the retaining block 22. A step 25 is cut into the top of the retaining block 22 to provide clearance 26a between the retaining block 22 and bottom 26 of the housing 11. The top of the retaining block 22 serves as a seat for a radial bearing 27 which is disposed between the larger two diameter cylindrical portion 28 of the shank and the two diameter bore 29 in the housing.

A thrust bearing 30 is carried by the smaller diameter 31 of the shank 23 between the step 32 formed by the reduced diameter of the shank 23 and a wall 33 in the top of the bore 29 in the housing 11. The wall 33 is formed by a counter bore 43 in the top 42 of the housing 11. It will be noted that the shank 23 is laterally offset from the longitudinal axis of the cylindrical pillar member 18 to provide a castering action for the wheel holder 13.

The upper portion of the shank 23 extends through the wall 33 in the housing 11 which is provided with a bore 34 for this purpose. The top of the shank 23 is drilled as indicated at 37 to receive a pin 35 which is longer than the diameter of the smaller diameter 31 of the shank 23. The pin 35 thus extends outwardly from the bore 37 and in a direction normal to the longitudinal axis of the shank. An elastomeric "O" ring 38 is carried by the top portion of the shank 23 in frictional contact with the smaller diameter 21 and is disposed beneath the outwardly extending portion of the pin 35. There is a small clearance between the pin and "O" ring 38 when the cutting wheel 16 is in contact with the glass surface.

Figure 2:
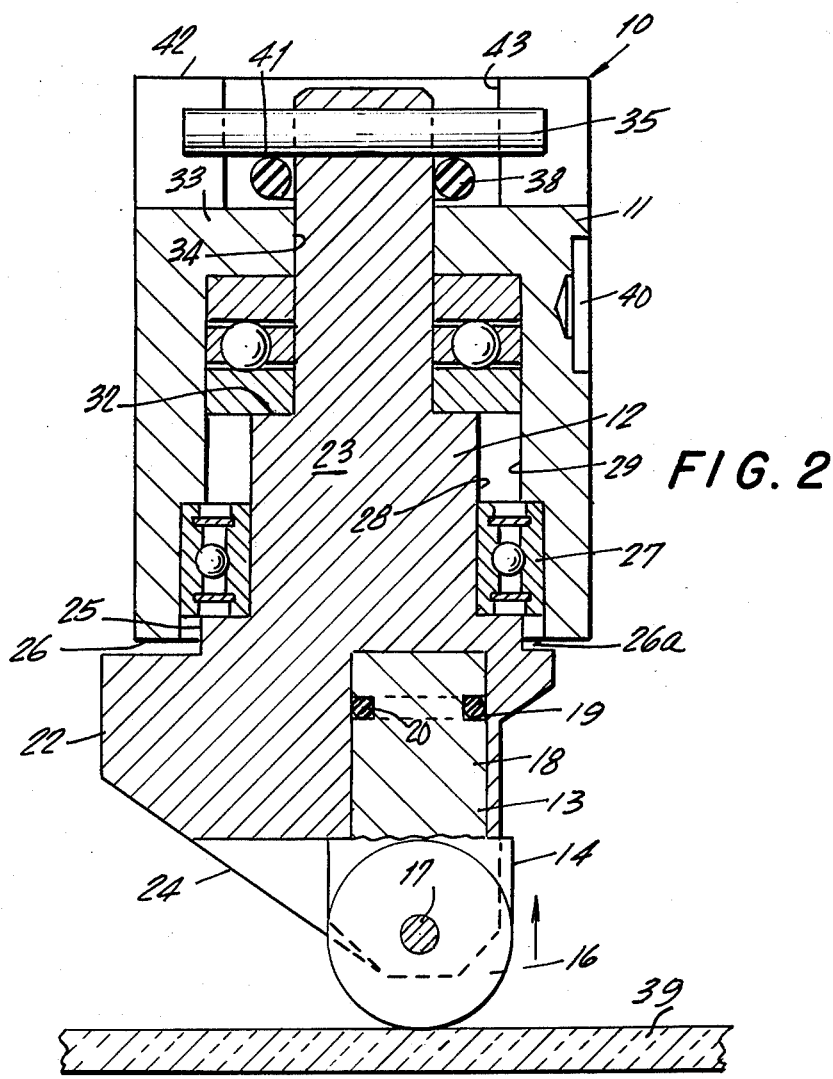
FIG. 2 is a sectional view taken on line 2—2 in FIG. 1 looking in the direction of the arrows.

When the post swivel 12 is raised to the position shown in FIGS. 2 and 4 by reason of the pillar post coming in contact with the surface of the glass 39 the shank 23 will move upwardly carrying the "O" ring with it. When the cutting wheel 16 leaves the surface of the glass 39 at the end of the cut the post swivel will slide downwardly together with the "O" ring which then makes frictional contact with the top 42 of the housing 11. Rotary movement of the cutting wheel and its holder is thus restricted. The cutting wheel will then meet the edge of the glass on the next cut at the same angle it left the glass sheet on the preceding cut.

It will be seen from an examination of FIGS. 3 and 5 that the top 42 of the housing 11 is slotted as shown at 36 to receive each end portion of the pin 35. The slots 36 are of a width which will permit the pin 35 to swing therein through an arc of the order of plus or minus 9° from a central axial position. The degree of swing is calculated on the basis of the normal amount of adjustment that will be encountered in the various cutting operations during the use of the pillar post. The angle in which the pin is swung will remain constant throughout successive cutting operations until such time as the cutting conditions change. The internal friction of the parts within the housing 11 is sufficient to prevent accidental rotation of the shank 23 during its axial movements in the housing.

A flat and a recess 40 best shown in FIGS. 2 and 5 is provided in the side of the housing 11 to receive a locking screw (not shown) in the glass cutting machine so that the pillar post can be secured within the machine initially with the pin 35 disposed in the middle of the slot 36 as shown in FIG. 3.

Having thus fully described the invention what is desired to be claimed and secured by Letters Patent is:

1. A pillar post, glass cutting wheel assembly for a glass cutting machine comprising an elongated housing, having a top and a bottom portion, a bore in said housing communicating with the bottom of the housing, an apertured wall in the housing forming the upper end of the bore, a counter bore in the top of the housing opposite the bore and separated therefrom by the wall, a post swivel rotatably and longitudinally shiftable within the housing comprising a retaining block and an upstanding shank received within and extending above the aperture in the wall, bearing means between the shank and the bore to support the shank within said bore, a glass cutting wheel, a glass cutting wheel holder for said wheel, a cylindrical pillar member on said wheel holder journaled within the post swivel, a transverse pin carried by that portion of the shank which extends above the wall and spaced from the top of said wall, a friction member carried by the shank between the pin and the wall and means in the housing cooperating with the pin to limit the angle of rotation of the post swivel.

2. A device according to claim 1 in which the post swivel bearing means are disposed between the housing, the housing wall and the post swivel.

3. A device according to claim 2 in which the bearings comprise an upper bearing in contact with the wall and a lower bearing, said upper bearing being a thrust bearing.

4. A device according to claim 1 in which the retaining block is stepped to provide a clearance between the said block and the bottom of the housing.

5. A device according to claim 2 in which the upstanding shank is a two diameter member to receive the bearings thereon.

6. A device according to claim 1 in which the retaining block is bored to receive the pillar member and transversely slotted to receive the wheel holder.

7. A device according to claim 6 in which the glass cutting wheel is freely carried by an axle coextensive in length with the wheel holder and in abutting relationship to the sides of the retaining block slot.

8. A device according to claim 1 in which the pillar member is grooved to receive a snap ring whereby the pillar member is retained within the retaining block.

9. A device according to claim 1 in which the friction member is an elastomer ring.

10. A device according to claim 9 in which the means to limit the angle of rotation of the post swivel comprises a transverse slotted portion in the counterbored portion of the housing within which the ends of the transverse pin is received 11. A device according to claim 1 in which the longitudinal axes of the post swivel shank and the cylindrical pillar member are parallel to but laterally and vertically disposed.

* * * * *